United States Patent [19]
Lohaus et al.

[11] Patent Number: 5,984,073
[45] Date of Patent: Nov. 16, 1999

[54] CLUTCH DISK WITH PIVOT SUPPORT

[75] Inventors: Norbert Lohaus; Achim Link, both of Schweinfurt, Germany

[73] Assignee: Mannesmann Sachs AG, Schweinfurt, Germany

[21] Appl. No.: 09/228,340

[22] Filed: Jan. 11, 1999

[30] Foreign Application Priority Data

Jan. 10, 1998 [DE] Germany .......................... 198 00 710

[51] Int. Cl.[6] .............................. F16D 3/14; F16D 47/02; F16D 69/00
[52] U.S. Cl. .................... 192/213.2; 192/204; 192/70.17
[58] Field of Search ........................... 192/107 R, 70.17, 192/213.12, 204, 30 V; 464/68, 69, 85

[56] References Cited

U.S. PATENT DOCUMENTS

| | | |
|---|---|---|
| 1,723,886 | 8/1929 | Pfaff . |
| 3,468,527 | 9/1969 | Mather ........................................ 267/1 |
| 5,542,516 | 8/1996 | Wack .................................. 192/70.17 |
| 5,722,525 | 3/1998 | Ament et al. ........................ 192/70.17 |
| 5,884,743 | 3/1999 | Kleifges et al. .................... 192/213.12 |

FOREIGN PATENT DOCUMENTS

| | | |
|---|---|---|
| 0 450 392 | 10/1991 | European Pat. Off. ........... F16F 3/10 |
| 823 223 | 6/1937 | France . |
| 32 48 120 | 6/1984 | Germany ........................ F16D 13/64 |
| 32 48 119 | 3/1992 | Germany ........................ F16D 13/64 |
| 43 13 944 | 11/1993 | Germany ........................ F16D 13/64 |
| 43 22 578 | 1/1994 | Germany ........................ F16D 13/64 |
| 44 09 254 | 9/1995 | Germany ........................ F16D 13/64 |
| 35 39 608 | 10/1996 | Germany ........................... F16F 1/06 |

*Primary Examiner*—Charles A Marmor
*Assistant Examiner*—Tisha D. Waddell
*Attorney, Agent, or Firm*—Cohen, Pontani, Lieberman & Pavane

[57] ABSTRACT

A clutch disk with two structural component groups which are arranged so as to be swivelably movable and radially movable relative to another within a defined scope by the intermediary of a guide element which is constructed as a helical spring and which is arranged concentric to the hub and whose turns—considered in the axial direction—are inclined at least in the installed state.

47 Claims, 5 Drawing Sheets

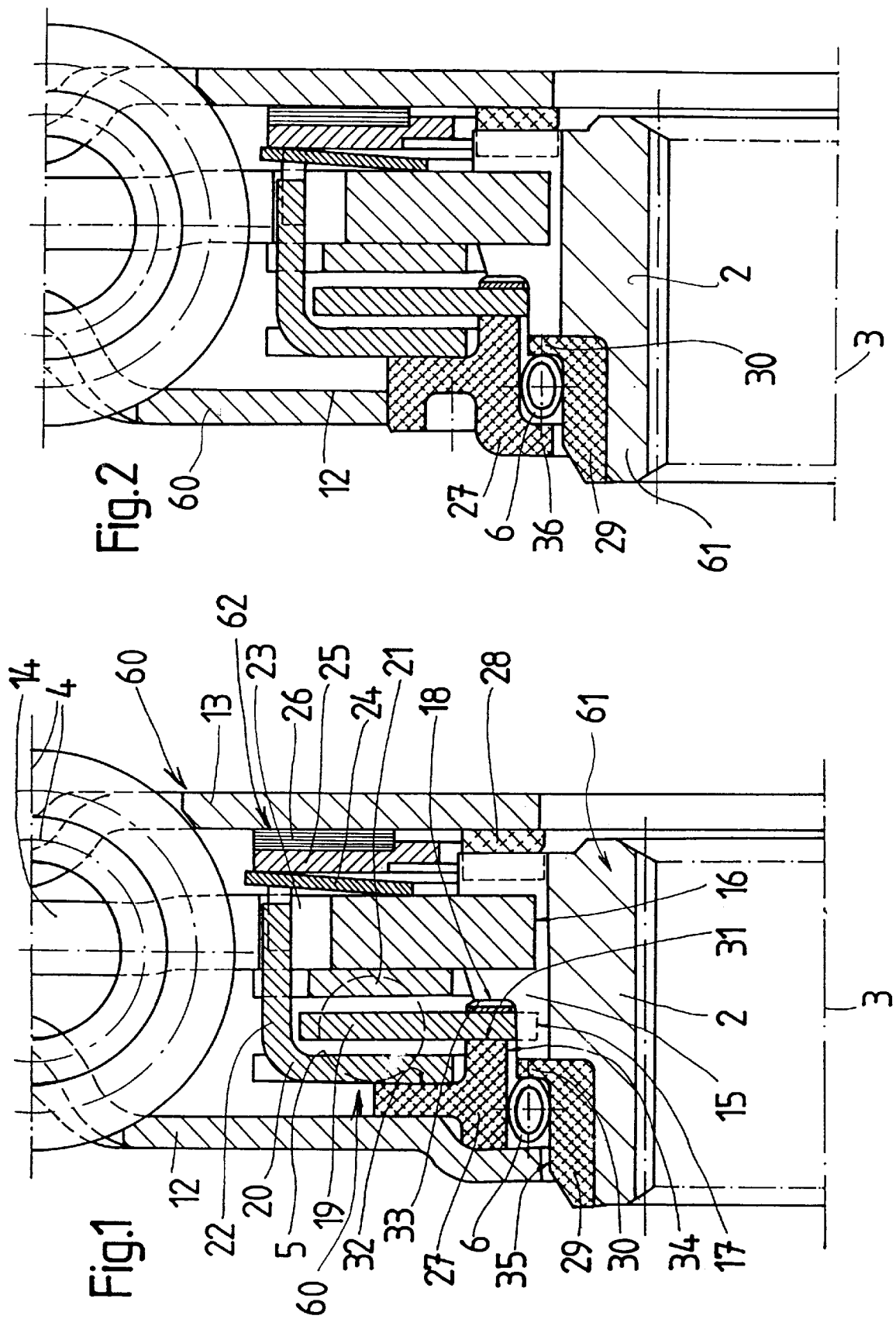

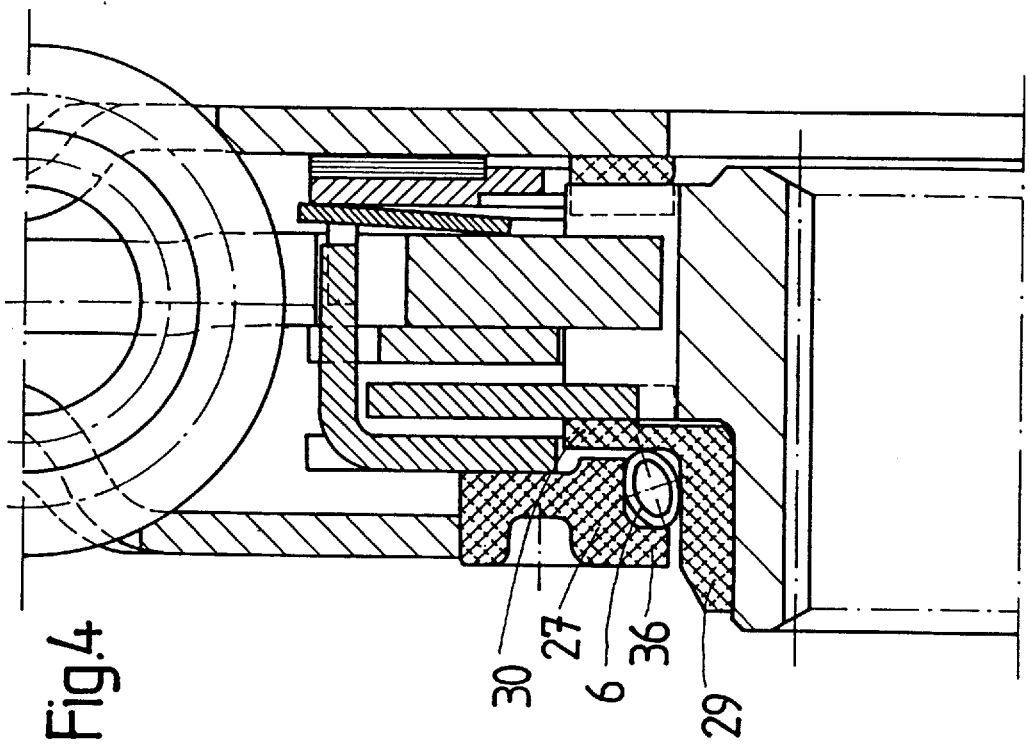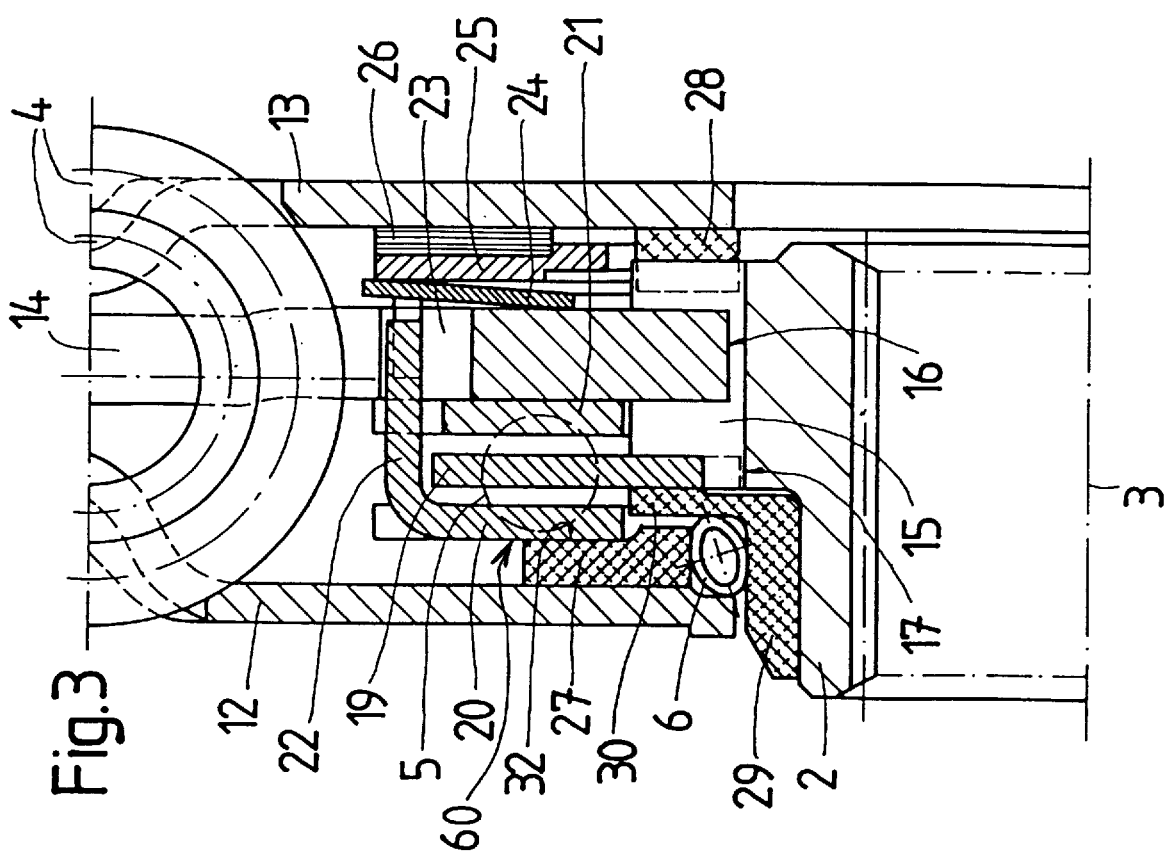

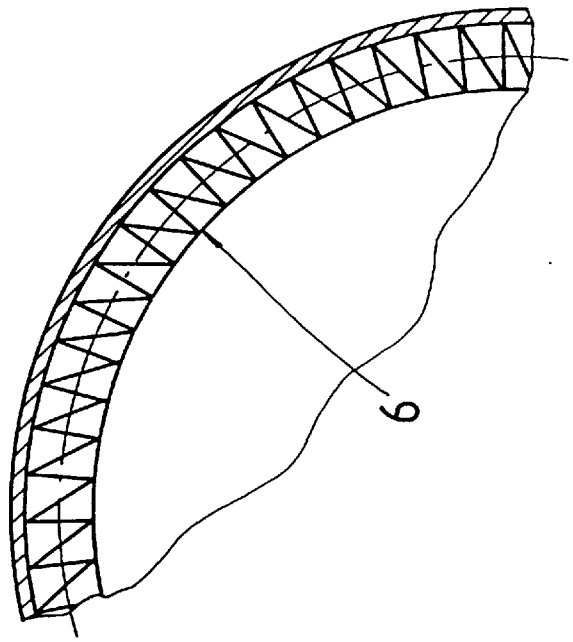
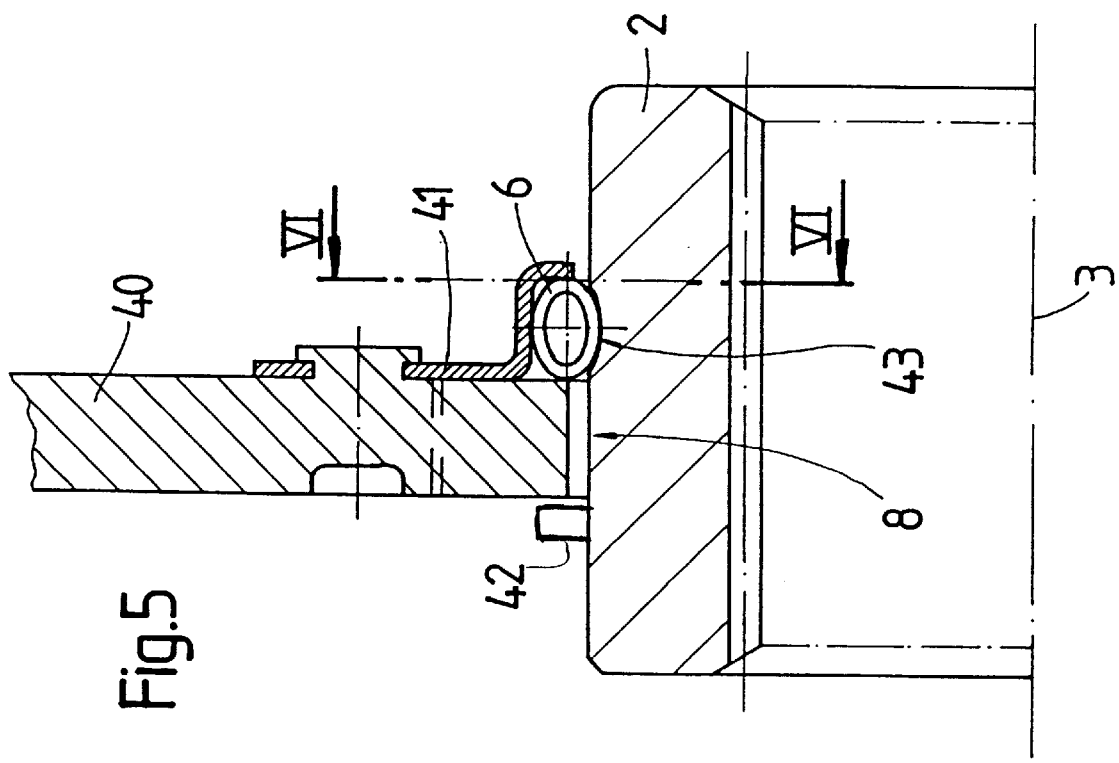

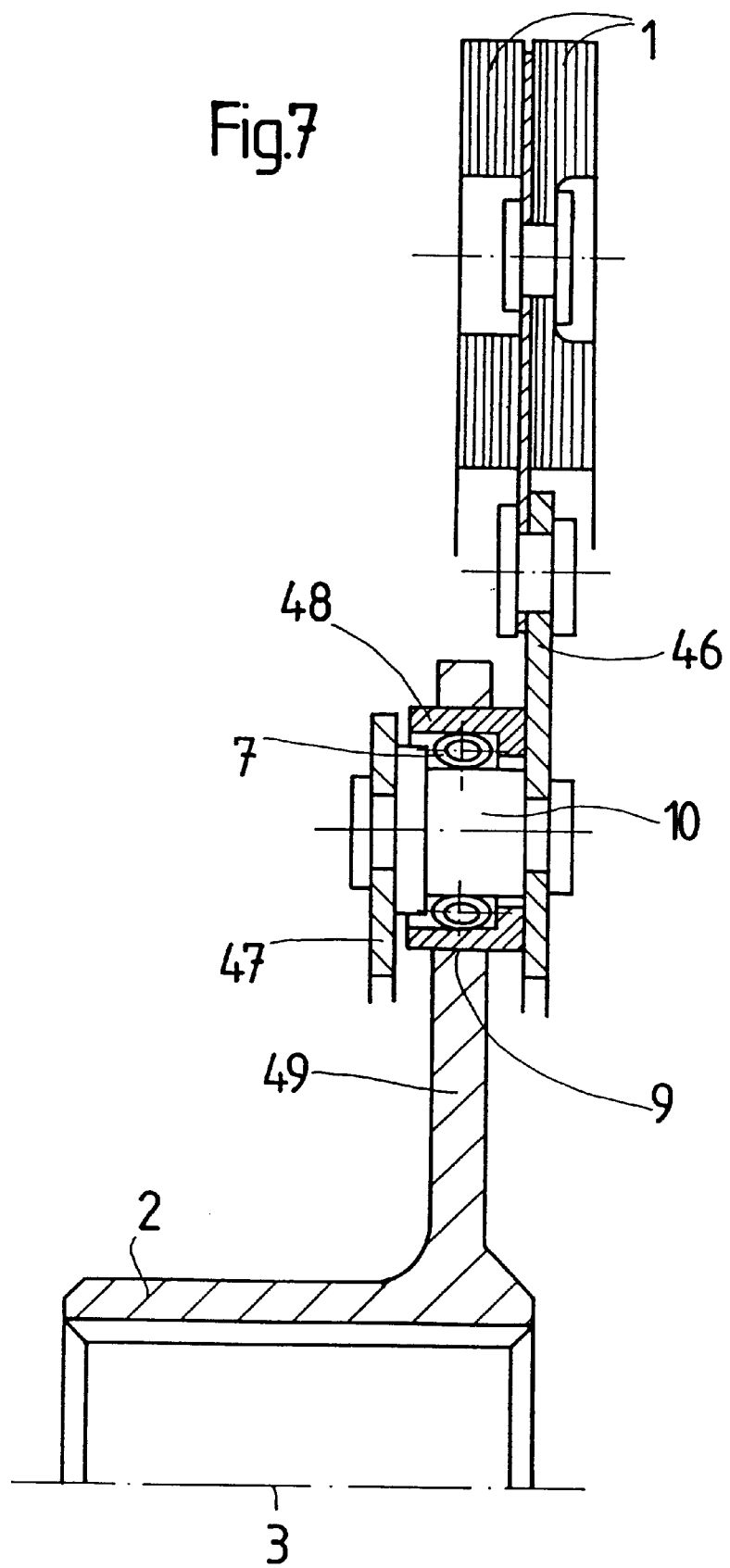

CLUTCH DISK WITH PIVOT SUPPORT

BACKGROUND OF THE INVENTION

1. Field of the Invention

The invention is directed to a clutch disk having a first structural component group having a friction element and a second structural component group having a hub that have a limited rotational play between them against the force of an energy accumulator acting in a circumferential direction and which may be centered relative to one another with a limited radial movement relative to an axis of rotation.

2. Description of the Related Art

There are many different constructions of clutch disks with pivot supports between input parts and output parts. For example, German Patent 32 48 119 includes a conical or spherical contour between one cover plate and the hub, wherein this contour is loaded by an axially acting spring in such a way that a self-centering effect is achieved which can be moved out of its centering position when the axes of rotation between the flywheel and transmission input shaft do not coincide. An axial relative movement between the two groups cannot be avoided in this case. Further, it is known from German Offenlegungsschrift 44 09 254 to arrange an elastomer ring between one cover plate and the hub. This elastomer ring may, for example, be constructed as a thin-walled tube filled with liquid or as a solid material.

SUMMARY OF THE INVENTION

It is an object of the present invention to provide a clutch disk having an input part and an output part which are radially displaceable and/or pivotable relative to each other and a returning force ensures an automatic centering of the input part and the output part in the absence of an external force.

According to the invention, this object is met in that a guide element is arranged between first and second structural component groups and is constructed in the manner of a helical spring which is arranged concentric to a hub and whose turns—considered in the axial direction—are inclined at least in the installed state. This type of guide element may be manufactured with high precision in an extremely economical manner and, as a result of the inclined position of the individual turns considered in the axial direction, enables a flat spring characteristic which ensures that the centering forces will not increase in an unwanted manner even in the event of very large deflections. This type of guide element enables a purely radial deflection of the two structural component groups relative to one another as well as capability of pivoting movement about the area of the guide element. The first and second structural components are designed so that this pivoting movement capability should naturally not be unnecessarily restricted by other structural component parts.

It is further known from German Offenlegungsschrift 43 22 578 to provide a toothing between the two structural component groups of the friction clutch which is fixed with respect to rotation and is substantially free of play and which allows an angular movement capability, and wherein a device is provided for self-centering.

To improve a construction of the type mentioned above, a guide element constructed in the manner of a helical spring is provided between the first and second structural component groups and is arranged concentric to the hub, wherein the turns of the helical spring guide element are inclined with respect to the axial direction at least in the installed state of the guide element. This type of guide element is inexpensively producible with high precision. The return characteristics of this guide element subsequent to deflection are very advantageous due to a very soft spring characteristic, since the forces do not increase too sharply even in the event of larger deflections. In this respect, the returning force of the guide element after a pivoting movement provides for a corresponding returning. A toothing of this type may also enable, within a limited scope, a radial deflection which is likewise returned by the guide element in the absence of external force. Two-mass flywheels, as they are called, are a particularly suitable application example for clutch disks of the kind mentioned above which have no lead suspension.

Further, in clutch disks having first and second structural component groups in which a limited rotational play is possible between the two structural component groups against the force of energy accumulators acting in the circumferential direction over at least a portion of the region of rotational play and against a device for centering after a defined radial and angular deflection, it is proposed that a plurality of substantially round openings which are distributed along the circumference are provided in one structural component group. A guide element arranged toward the opening or a plurality of individual guide element parts is (are) inserted in each opening, wherein a guide prolongation of the other structural component group extends into the inner diameter of the guide element, wherein the guide element is constructed in the manner of a helical spring which is arranged concentric to the guide prolongation and whose turns—considered in the axial direction—are in an inclined position at least in the installed state. As a result of the inclined position of the turns—considered in the axial direction—the spring rate of the guide element can make use of a very flat characteristic line with respect to application of force, so that there is no sharp increase in returning forces even in the event of very large deflections. The openings may diverge from the circular shape (e.g., can be oval or elliptic).

In all of the possible embodiments, a multiple-part guide element may be provided instead of a one-part guide element, wherein the multiple-part guide element comprises individual helical-spring-like portions which are inserted into openings provided separately for this purpose. A construction of this kind can be advantageous, for example, when there is no circumferential space for a one-part guide element. For example, a plurality of guide elements can be arranged in openings which are straight, wherein the openings extend, e.g., tangentially about a center point. Individual elements may also be advantageous with respect to ease of assembly. Further, it is possible, of course, to provide two of these guide elements at an axial distance from one another so that, for example, the centering effect is improved and weaker guide elements may be used.

In this connection, every guide element in the preferred embodiment is installed with pretensioning in the radial direction. This type of pretensioning ensures, for example, that the returning force applied by the guide element does not fall below a determined minimum value. In so doing, it is ensured that the inclined position of the individual connections is secured so that the flat spring characteristic is maintained at the same time.

The pretensioning of the guide element should correspond at least to the weight of the structural component groups which are movable relative to one another, so that a full centric resetting is possible subsequent to application of force. In some cases, it should also be taken into account with regard to this pretensioning that the unbalance forces acting on the circumferentially extending parts are also absorbed by the pretensioning.

The guide element may advantageously fix the first and second structural component groups relative to one another at least in one axial direction. In this way, the guide element assumes a dual function and a separate additional fixing may be dispensed with. In a construction in which the first structural component group comprises cover plates which are connected with one another and arranged at a distance axially from one another and the second structural component group comprises a hub disk extending between the two cover plates, it is proposed that the axial fixing of the two structural component groups is carried out by the cover plates on and the hub or a hub disk and the guide element is arranged between one cover plate and the hub. Since this guide element need not absorb any axial guiding forces, it can be installed so as to be loose in the axial direction without loading by axial force. A low loading of this constructional element is accordingly achieved.

In this connection, a multiple-part friction device with at least one axially acting spring which brings about axial centering may be provided between the cover plates and the hub disk or hub. In an advantageous manner, a structural component part of the friction device may be fastened to the inner diameter of one cover plate so that an inner diameter of the structural component part rests on the guide element by its inner diameter. Therefore, this structural component part is allotted a dual function in that it is supported relative to the guide element on the one hand and is a part of the friction device on the other hand.

The cover plate or the structural component part has a guide edge facing radially inward at a distance axially from the hub disk or hub for axial spatial limiting of the guide element.

In a clutch disk in which the hub and the hub disk are arranged so as to be fixed with respect to rotation and fixed axially (the construction may be a one-part or multiple-part construction), the structural component part is advantageously acted upon by axially acting spring force to generate the basic friction. The structural component part accordingly has a dual function, namely, that of radial support relative to the guide element and generation of a basic friction.

In a construction of the clutch disk in which the hub and the hub disk are connected so as to be fixed with respect to rotation via a toothing with play in the circumferential direction, it is proposed that one cover plate is acted upon via one structural component part of the friction device by an axially acting spring away from one end of the outer toothing of the hub, and the other cover plate is supported at the opposite end of the outer toothing by another structural component part of the friction device, and the axially acting spring, together with the structural component parts, generates the basic friction. In this connection, the force path for generating the basic friction is supported by the two oppositely directed ends of the outer toothing of the hub.

In an embodiment of a clutch disk in which an idle spring device is arranged between the hub disk and one of the first and second cover plates with the hub disk arranged on the outer toothing so as to be fixed with respect to rotation relative to it but so as to be loose axially, at least one idle spring cover plate is arranged between the hub disk and one of the first and second cover plates. The idle spring cover plate is axially supported at the hub disk. The idle spring device further includes corresponding spring elements between the hub disk and the at least one cover plate. This embodiment also includes a load friction device with at least one axially acting load friction spring arranged between the hub disk and the other of the first and second cover plates. In this embodiment, a structural component part has two contact surfaces parallel to the guide edge and perpendicular to the axis of rotation so as to be offset axially and radially, one of which contact surfaces contacts the idle spring cover plate and is acted upon by the load friction spring, and the other contact surface contacts the hub disk of the idle spring device and is acted upon by a spring of the basic friction device, which spring is arranged between the side of the hub disk remote of the structural component part and a shoulder of the outer toothing. This construction enables a radial guiding relative to the guide element and the forming of two friction surfaces for two different friction values with one structural component part.

In a clutch disk with a toothing between the first and second structural component groups which is substantially free from rotational play and which allows defined angular movement, it is proposed that the guide element is arranged axially adjacent to the toothing. An arrangement of this kind is advantageous with respect to the centering action proceeding from the guide element. It is also possible that a guide element may be provided on each of the two sides axially adjacent to the toothing.

In this case, the guide element is advantageously located between an inner diameter of a support element arranged laterally at the hub disk and an outer diameter of the hub, wherein an axial stop is arranged at the hub on the side of the hub disk remote of the support element and, on the side of the support element, the guide element preferably functions as an axial stop in the opposite direction. For this purpose, a groove is incorporated in the hub, wherein the guide element partially penetrates into the groove in the radial direction.

According to another feature of the invention, the guide element may also take over the function of guiding the first and second structural component groups in both axial directions. In this case, the guide element partially penetrates into a corresponding circumferential recess in one cover plate of the clutch disk and in the hub, wherein each of these recesses has radially extending guide edges arranged so as to be spaced axially. In such a case, the hub disk of the clutch disk is arranged in an axially floating manner relative to the hub. An additional hub disk which is part of an idle torsion damper device an which is held without force by the spring of the load friction device may be arranged without play in the circumferential direction in the outer toothing of the hub. The hub disk of the idle torsion damper device is arranged so as to be loose in the axial direction and parts of a friction device which are effective only in the idle range are arranged on both sides of the hub disk. This friction device can accordingly be adapted in a very specific manner to the damping requirements in the idle range.

A particularly advantageous construction is provided when the guide element or guide elements is or are acted upon by axial pretensioning in addition to the radial pretensioning, wherein a frictional force is generated for the base friction by means of this axial pretensioning. In this way, the guide element eliminates the requirement for a spring which would otherwise be required for generating the basic friction. In this case, the guide element also takes over the guiding of the two structural component groups relative to one another in an axial direction.

The hub disk is mounted on the outer toothing of the hub so as to be loose axially and is clamped and fixed between the first and second cover plates by at least one load friction spring and at least one friction element. The second cover plate has axial frictional contact with the end side of the outer toothing associated with it and the first cover plate is pretensioned radially and axially by the guide element or guide elements in such a way that the first cover plate is acted upon by force away from the end of the hub toothing associated with it.

In this type of construction, an idle spring device is advantageously provided between the hub disk and the first cover plate. The idle spring device has a hub disk which is mounted on the outer toothing of the hub so as to be fixed with respect to rotation relative to it but axially loose and an idle spring cover plate between the idle hub disk and the first cover plate which is supported axially at the load hub disk and at the cover plate by the force of the load friction spring. A friction element of the load friction device is arranged between the idle spring cover plate and the first cover plate is simultaneously supported in its radially inner region on the guide element. The friction element accordingly performs a number of functions simultaneously.

The guide element is supported relative to the hub by a bearing element which is substantially L-shaped with an annular leg which is mounted concentrically on the hub and faces away from the hub disk and a radially projecting leg which contacts the end side of the outer toothing and forms axial securing means for the idle hub disk. Accordingly, this bearing element is also allotted a multiple function.

The various features of novelty which characterize the invention are pointed out with particularly in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

FIG. 1 is a partial longitudinal sectional view of a clutch disk with idle spring device and load spring device and a guide element according to an embodiment of the invention;

FIG. 2 is a partial longitudinal sectional view of another embodiment of the clutch disk according to FIG. 1;

FIG. 3 is a partial longitudinal sectional view of another embodiment of the clutch disk according to FIG. 1 in which the guide element applies an axially directed force for the generation of friction;

FIG. 4 is a partial longitudinal sectional view of another embodiment of the clutch disk according to FIG. 3;

FIG. 5 is a partial longitudinal sectional view of another embodiment of the clutch disk according to the invention without an idle spring device;

FIG. 6 is a sectional view of a guide element along line VI—VI in FIG. 5;

FIG. 7 is a longitudinal sectional view of another embodiment of a clutch disk according to the invention with an arrangement of guide elements radially outside of a hub element;

DETAILED DESCRIPTION OF THE PRESENTLY PREFERRED EMBODIMENTS

Figure 8:
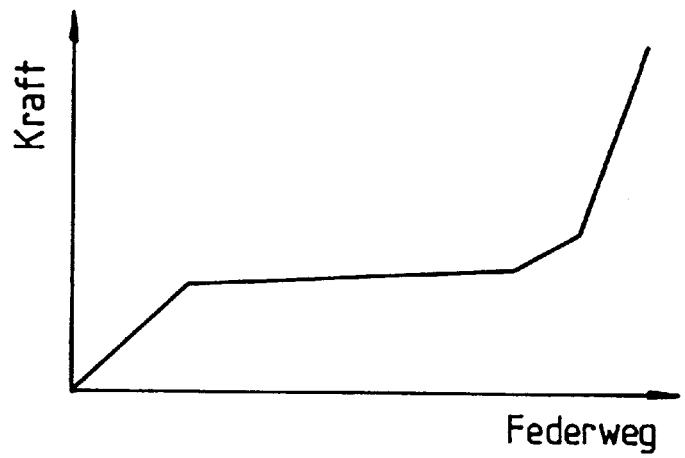
FIG. 8 shows a force-spring path characteristic of the guide element according to the invention.

FIG. 1 shows a partial longitudinal section through a clutch disk according to an embodiment of the invention having a hub 2 arranged concentric to an axis of rotation 3. The hub 2 has an inner toothing so that it is fixedly connectable with respect to rotation on a transmission input shaft. The hub 2 also has an outer toothing 15 which engages an inner toothing 16 of a hub disk 14 so that a predetermined amount of play is present in the circumferential direction between the hub 2 and the hub disk 14. The hub disk 14 extends radially outward and has windows for receiving helical springs 4. Two cover plates 12 and 13 are arranged at the sides of the hub disk 14 and at a distance therefrom. In a manner not shown, these cover plates 12 and 13 are fixedly connected with one another and held at a predetermined distance from each other. Both cover plates 12 and 13 also have windows for receiving the same helical springs 4. One of the cover plates 12, 13 extends radially further than the other of the cover plates 12, 13 and carries friction facings at the radially outward location. The friction facings can be clamped between the flywheel and a pressure plate of a friction clutch for conducting torque through the clutch disk into the transmission input shaft.

An idle spring device 50 is arranged between the hub disk 14 and the cover plate 12. This idle spring device 50 comprises a hub disk 19 with an inner toothing 17 which engages in the external toothing 15 of the hub 2 so as to be fixed with respect to rotation but axially displaceable. The outer diameter of the external toothing 15 is reduced in this region which engages the inner toothing 17 and has a shoulder or a step 18 in this region. The idle spring device 50 further comprises a first idle spring cover plate 20 which is arranged between the hub disk 19 and the cover plate 12. Axially projecting protuberances 22 at the radial outer region of the first idle spring cover plate 20 are inserted through openings 23 in the hub disk 14 and thereby fix the first idle spring cover plate 20 to the hub disk 14 with respect to rotation. A second idle spring cover plate 21 directly contacts the hub disk and is connected with the first idle spring cover plate 20 so as to be fixed with respect to rotation relative to it. In both the first and second idle spring cover plates 20, 21 and in the hub disk 19, window disks are provided for receiving helical springs 5 for the idle spring device 50. To generate a relatively large friction force, a load friction spring 24, a pressure spring 25 and a friction ring 26 are arranged between the hub disk 14 and the cover plate 13 remote from the idle spring device 50. The force exerted by the load friction spring 24 is conducted via the hub disk 14, the protuberances 22, the cover plate 20, an installation part 27, the cover plate 12 and connection elements between the two cover plates 12 and 13, to the friction ring 26 and the pressure ring 25. The installation part 27 has a multiple function: it is arranged in the cover plate 12 so as to be radially fixed therewith and has a contact surface 32 which contacts the outer side of the first idle spring cover plate 20 under the influence of the load friction spring 24. The radially inner side of the installation part 27 has an opening concentric to the axis of rotation 3 with an inner diameter 34. The installation part 27 and the cover plates 12 and 13 are guided radially relative to the hub 2 with respect to this inner diameter 34 in that a special guide element 6 is arranged between the inner diameter 34 and an outer diameter 35 of either the hub 2 or a bearing element 29. This guide element 6 will be more fully described below. On the radially inner side of the structural component part 27 along the contact surface 32, another contact surface 31 contacts the hub disk 19 of the idle spring device 50, under the force of a spring, for example, a wave spring 33, which is supported between the shoulder 18 of the outer toothing 15 of the hub 2 and the hub disk 19.

A further structural component part 28 is arranged between the radial inner region of the cover plate 13 and the front region of the outer toothing 15 located axially opposite thereto. The further structural component part 28 generates a basic friction in connection with the wave spring 33 and structural component part 27. The guide element 6 mentioned above is arranged radially between the two diameters 34 and 35 and axially between a region arranged at the radial inner edge of the cover plate 12 and another region arranged through a radially extending web 30 of the bearing element 29. The axial space is dimensioned so that the guide element 6 is installed without axial clamping.

The guide element 6 may comprise one continuous part and may be either upon or self-enclosed concentrically around the axis of rotation 3. However, the guide element may also comprise two or more individual elements which are circumferentially spaced from one and are arranged in individually provided chamber areas. In every case, the guide element or guide elements 6 are constructed as helical screws, wherein the turns—considered in the axial direction—are in an inclined position at least in the installed state. FIG. 6 shows a view of this construction. The radial space between the inner diameter 34 and the outer diameter 35 is dimensional smaller than the individual turns of the guide element 6, so that an inclined position of the guide element 6 is achieved in the installed state. A certain inclined position may be carried out in an advantageous manner already during the manufacture of the guide element, so that installation is facilitated and the inclined position need only assume an exactly predetermined measurement when installed. Due to this type of construction of a guide element 6 which is produced, for example, form spring steel wire, there results a radially acting centering force whose spring characteristic is very flat considered over the spring path. FIG. 8 shows a graph of this characteristic curve of the spring force.

The radial pretensioning of the guide element 6 effects a centering in the radial direction of a first structural component group 60 including the two cover plates 12 and 13 with the friction facings and a second structural component group 61 including the hub 2 even when misalignment of the axes occurs in operation as a result of the differences between the axis of rotation 3, which corresponds to the axis of rotation of the transmission input shaft and the axis of rotation of the crankshaft of the internal combustion engine which predetermines the axis of rotation of the friction facings (in the engaged state of the friction clutch). Furthermore, the pretensioning of guide element 6 enables a certain relative angular movement between the first and second structural component groups 60, 61 which is useful when the first structural component group 60 with the friction facings carries out a certain wobbling movement in connection with the crankshaft or the flywheel of the internal combustion engine or when such a wobbling movement occurs due to the transmission input shaft and the hub. In every case, the radially pretensioned guide element 6 is capable of centering the first and second structural component groups 60 and 61 in the unloaded state. For this purpose, the radial force of the guide element 6 must be configured so that at least the weight of one of the first and second structural component groups 60, 61 is balanced and imbalance forces, if any, which may occur due to unequal mass distribution and higher rates of rotation are also balanced in addition. The angular movement capability is naturally made possible in that the cover plate 13 situated farthest from the guide element 6 is sufficiently capable of moving radially inward. The possibility of radial movement in the region of the guide element 6 is possible because the radial inner region of the cover plate 12 has certain play relative to the outer diameter 35 of the bearing element 29 and the web 30 has a certain play relative to the inner diameter 34 of the installation part 27.

Further operation of the clutch disk of FIG. 1 is briefly described in the following. When torque is introduced into the cover plates 12 and 13, initially only the idle spring device 50 is acted upon by torque and the spring 5 is compressed in that cover plates 12 and 13, springs 4 and the hub disk 14 are considered as a relatively stiff constructional unit. In the region of the circumferential play between the outer toothing 15 of the hub 2 and the inner toothing 16 of the hub disk 14, only the helical springs 5 are acted upon by torque in that the first and second idle spring cover plates 20 and 21 are connected with the hub disk 14 so as to be fixed with respect to rotation relative to it and the hub disk 19 is mounted without play on the hub 2 so as to be fixed with respect to rotation relative to it. In this case, the basic friction device generated by the wave spring 33 also takes effect, wherein a relative movement occurs between the cover plate 12 and the hub disk 19 and a relative movement occurs between the cover plate 13 and the structural component part 28. The structural component part 28 is inserted in the outer toothing 15 so as to be fixed with respect to rotation relative to it. The axial fixing between the first and second structural component groups 60 and 61 is ensured by the two cover plates 12 and 13. The wave spring 33 ensures that the cover plate 13 contacts the structural component part 28 in the direction of the hub 2, and the hub disk 19, together with structural component part 27 and cover plate 12, is acted upon by the spring force away from the shoulder 18. When acted upon by torque in excess of the force of springs 5, the outer toothing 15 and the inner toothing 16 contact one another and the idle spring device 50 is then blocked, thereby activating the load spring system with the springs 4. This results in a relative rotation between the two cover plates 12 and 13 and the hub disk 14, so that a load friction device 62 takes effect parallel to the idle spring device 50. This results in an effective friction surface between a friction ring 26 and the cover plate 13 and between the cover plate 20 of the idle spring device 50 and the cover plate 12 with the intermediary of the installation part 27 with its contact surface 32.

FIG. 2 shows a slightly modified embodiment of the device of FIG. 1. In this embodiment, the installation part 27 includes a radially inwardly facing web 36 for axial limiting of the installation space for the guide element 6. The cover plate 12 is accordingly constructed in a simpler manner and is connected at the radially outer end of the installation part 27. The bearing element 29 is not changed with respect to FIG. 1. However, it is also possible to eliminate the bearing element 29 and to support the guide element 6 in corresponding regions of the hub 2.

FIGS. 3 and 4 show further embodiments of the clutch disk that essentially correspond to the embodiments of FIGS. 1 and 2. The essential difference between the embodiments shown in FIGS. 3 and 4 and the embodiments shown in FIGS. 1 and 2 is that the guide element 6 is installed not only with radial pretensioning for centering the first and second structural component groups 60 and 61 of the clutch disk relative to one another, but also additionally with axial pretensioning for generating a basic friction. Therefore, the embodiments of FIGS. 3 and 4 do not require a separate spring for generating the basic friction. For effecting the axial pretensioning, the bearing element 29 has a radial web 30 which extends radially outward to the extent that it forms an axial stop for the hub disk 19 of the idle spring device 50. The hub disk 19 is mounted on the outer toothing 15 of hub disk 2 by its inner toothing 17 so that it has axial play but is fixed with respect to rotation. The radial pretensioning of the guide element 6 and its centering effect has already been described in connection with FIGS. 1 and 2. The axial pretensioning of the guide element 6 is supported by the cover plate 12, the connection elements between cover plates 12 and 13 (not shown), the cover plate 13, structural component part 28, the front side of the outer toothing 15 of the hub 2, and the web 30. In FIG. 4, which corresponds to the embodiment of FIG. 2, the structural component part 27 is constructed so that it also receives the axial pretensioning of the guide element 6 directly via its web 36. On the other axial side, the guide element 6 contacts the web 30 of the bearing element 29 under the influence of its axial pretensioning.

FIG. 5 shows another embodiment according to the invention in which the clutch disk does not have a torsion spring device. In FIG. 5, a hub disk 40 is connected with a toothing 8 so as to be fixed with respect to rotation relative to the hub 2. This toothing 8 allows a large radial movement capability and a certain tilting movement capability without any appreciable play in the circumferential direction. The guide element 6 centers the hub disk 40 with respect to the hub 2. The guide element 6 may be constructed as a structural component part which extends concentrically around the axis of rotation 3 as shown in a side view in FIG. 6. However, the guide element 6 may also include two or more individual portions which are limited with respect to the circumference and act separately from one another. The guide element 6 is supported in the present case at the inner circumference of a support element 41 which is fastened laterally to the hub disk 40. The support element 41 may be constructed, for example, as a sheet metal part and is riveted with the hub disk 40. Other suitably strong materials and other connection methods such, for example, as welding and gluing may also be used. The axial correspondence is given in that the guide element 6 engages in the radial direction at least partially in a circumferentially extending groove 43 of the hub 2. The guide element 6 accordingly takes over the connection between the hub disk 40 and the hub 2 in both axial directions. The groove 43 can be constructed in such a way that the hub disk 40 and hub 2 can be disassembled without damaging the guide element 6 by including a bevel in the groove 43 in both axial directions.

Instead of arranging the support element 41 against the hub disk, the support element may also be arranged so that there is an axial distance between the support element 41 and the hub disk 40 and to allow a prolongation connected with the hub 2 or a one-piece prolongation to extend into this gap, so that the guide element 6 does not effect an axial guiding function and is mounted on a continuous diameter of the hub 2.

This embodiment may optionally include an axial stop 42 mounted on the hub 2 for limiting the axial movement of the hub disk 40. The axial stop 42 may be arranged on either side of the hub disk and two axial stops 42 may be arranged on both axial sides of the hub disk 40 to limit the movement of the hub disk in both axial directions.

FIG. 7 shows a longitudinal section of another embodiment of a clutch disk according to the invention. In this embodiment, guide elements 7 are arranged between the input parts and the output parts of the clutch disk that enable a defined radial movement capability, a defined tilting movement capability and a defined suspension or springing in the circumferential direction. FIG. 7 shows two friction elements 1 which are arranged on the radially outer portion of a cover plate 46 and which can be clamped between a flywheel and a pressure plate of a friction clutch. These friction elements 1 are fastened to the cover plate 46 which has a rotational connection with a hub disk 49 of the hub 2. The hub 2 is arranged concentric to an axis of rotation 3. The cover plate 46 and another cover plate 47 are arranged on both sides of the hub disk 49. The two cover plates 46 and 47 are connected with one another so as to be fixed with respect to rotation relative to one another via connection elements in the form of guide prolongations 10 and are held at a distance from one another. The hub disk 49 is provided in the region of these guide prolongations 10 with round openings 9 which are distributed along the circumference and in which the guide elements 7 contact directly or indirectly with radial pretensioning. In the embodiment shown in FIG. 7, a bushing 48 is provided between the guide elements 7 and the openings 9. This bushing 48 is inserted into corresponding openings 9 so as to be axially fixed, for example, and forms an axial stop relative to the two cover plates 46 and 47 for fixing the axial installation space of the guide elements 7. As was already described with reference to the example of the guide elements 6, the guide elements 7 are installed with radial pretensioning in such a way that the individual turns are inclined as viewed in the axial direction and have a pretensioning in the radial direction. They enable a radial centering force between the input parts and the output parts of the clutch disk; they accordingly enable a radial deflection within a certain scope and an inclined position and also enable a circumferential springing to some degree. A clutch disk of this kind is able to compensate for manufacturing inaccuracies by allowing the alignment of the axis of rotation 3 to lie outside of the alignment of the crankshaft of the internal combustion engine. This prevents the transfer of excessive load to the transmission input shaft on the path from the friction elements 1 to the hub 2.

Figure 9:
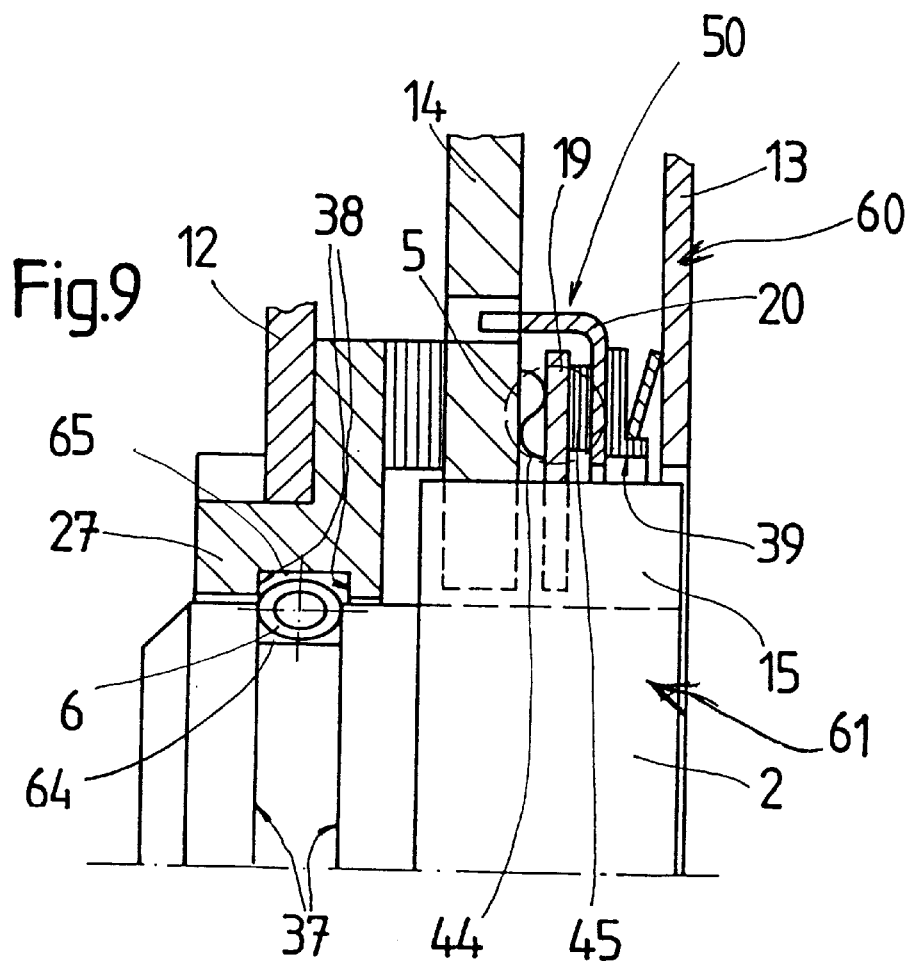
FIG. 9 is a graph showing a partial longitudinal section through a clutch disk with a guide element which fixes the two structural component groups axially relative to one another.

FIG. 9 is a partial sectional view of yet another embodiment of the present invention. The guide element 6 fixes the two structural component groups 60 and 61 in both axial directions relative to one another in this embodiment. For this purpose, a groove 64 is introduced into the hub 2 with two guide edges 37 which are located opposite from one another axially. The distance between the two guide edges 37 corresponds to the extension of the guide element 6. A corresponding groove 65 is likewise incorporated in the installation part 27 for the radial support of the two cover plates 12 and 13 relative to the hub 2 and has two axially spaced guide edges 38 which likewise have an extension roughly corresponding to the axial extension of the guide element 6. All of the parts of the structural component group connected with the friction elements are arranged so as to be axially displaceable relative to the hub 2 so that the axial guide is not loaded by other structural component elements or other forces. This relates to the hub disk 14 of the load spring device and the hub disk 19 of the idle spring device 50. Both hub disks 14 and 19 are arranged with their inner teeth on the outer teeth 15 of the hub 2 so as to be axially displaceable. The idle spring device 50 is arranged between the hub disk 14 and the cover plate 13 and includes the hub disk 19, at least one cover plate 20 and a plurality of springs 5 arranged in corresponding windows. The cover plate 20 is acted upon axially by a friction device 39 comprising a spring 67 and a friction ring 68 on this side and having an additional friction ring 69 on the opposing side located of the hub disk 14. The transmission of force is carried out over the cover plate 20 supported axially at the hub disk 14, over the hub disk 14, over a friction element, and over the structural component part 27, to the cover plate 12 and further, over the constructional elements connecting the cover plates 12 and 13, to the cover plate 13. Further, this embodiment also includes a friction device arranged between the cover plate 20 and the hub disk 14 which is active only in the idling range and which comprises at least one friction ring 45 and a spring 44 arranged on different sides of the hub disk 19. The spring 44 is outfitted with a smaller axial supporting force than the spring of the load friction device.

The guide element 6 enables a radial centering between the first and second structural component groups 60 and 61 and a reciprocal swiveling for producing a flexibility which is provided by the pretensioning force of the guide element 6 with a self-centering effect in the absence of external forces.

The invention is not limited by the embodiments described above which are presented as examples only but can be modified in various ways within the scope of protection defined by the appended patent claims.

We claim:

1. A clutch disk for use in a friction clutch, comprising:
   a first structural component group having a friction element and a radially inwardly facing surface;
   a second structural component group having a hub and a radially outwardly facing surface rotatably mounted relative to said the first structural component group;
   an energy accumulator operatively mounted between said first structural component group and said second structural component group for exerting a circumferential force between said first and second structural component groups so that said second structural component group is rotatable relative to said first structural component group against said force of said energy accumulator; and
   a guide element including a helical spring having turns that are inclined in an axial direction operatively mounted between said radially inward facing surface of said first structural component group and said radially outward facing surface of said second structural component group for exerting a centering force on said first and second components for centering said first structural component with respect to said second structural component so that said first structural component group is movable relative to said second structural component group against said centering force of said guide element.

2. The clutch disk of claim 1, wherein said guide element is radially pretensioned.

3. The clutch disk of claim 2, wherein an amount of said pretensioning corresponds to a weight of one of said first and second structural component groups.

4. The clutch disk of claim 1, wherein said guide element prevents axial movement of said first structural component group relative to said second component group in at least one axial direction.

5. The clutch disk of claim 1, wherein said first structural component group comprises a first cover plate fixedly connect to and arranged at a first distance from a second cover plate;
   said second structural component group comprises a hub disk extending radially outward from said hub between said first and second cover plates;
   wherein said first and second plates and one of said hub and said hub disk axially fix said first structural component group with said second structural component group and said guide element is arranged between one of said first and second cover plates and said hub.

6. The clutch disk of claim 5, further comprising a friction device comprising at least one axially acting spring arranged between said first structural component group and said second structural component group.

7. The clutch disk of claim 6, wherein said friction device further comprises a friction component fastened to a radially inner end of said one of said first and second cover plates and having a radially inner surface resting on said guide element.

8. The clutch disk of claim 7, wherein one of said first cover plate and said friction device comprises a radially inward facing guide edge web at a distance from said hub for axially limiting an axial space occupied by said guide element.

9. The clutch disk of claim 8, wherein said hub disk is axially and rotatably fixedly connected to said hub and wherein force is applied to said friction device by said at least one axially acting spring.

10. The clutch disk of claim 8, wherein said hub disk is fixedly connected with respect to rotation to said hub with a predetermined amount of play via a toothing having a first axial side facing said first cover plate and a second axial side facing said second cover plate and said at least one acting spring is compressed between said first axial side of said toothing and said friction device for urging said friction device against said first cover plate; and
   a further friction component is arranged between said second axial side of said toothing and said second cover plate so that said at least one axially acting spring, said friction component, and said further friction component generate a basic friction between said first structural component group and said second structural component group.

11. The clutch disk of claim 10, further comprising an idle spring device arranged between said hub disk and one of said first and second cover plates rotatably fixed and axially movably mounted on said toothing comprising an idle spring cover plate axially supported at said hub disk, an idle spring hub disk, and spring elements arranged between said idle spring hub disk and said idle spring cover plate; and
   a load friction device having at least one axially acting load friction spring arranged between said hub disk and the other of said first and second cover plates.

12. The clutch disk of claim 11, wherein said friction component comprises first and second contact parallel to said guide edge web and perpendicular to said axis of rotation, said first contact surface being axially and radially offset from said second contact surface;
   said first contact surface contacting said idle spring cover plate and urged toward said first cover plate by said load friction spring and said second contact surface contacting said idle spring hub disk and urged toward said first cover plate by said at least one axially acting spring arranged between and first axial side of said toothing and said idle spring hub disk.

13. The clutch disk of claim 4, wherein said first structural component group comprises a first cover plate fixedly connected to and arranged at a first distance from a second cover plate, said second structural component group comprises a hub disk extending radially outward from said hub between said first and second cover plates, and said clutch disk further comprises a load friction device comprising at least one load spring arranged between said first and second cover plates and said hub disk for generating an axial force;

said hub disk having an inner toothing in meshed engagement with an outer toothing of said hub with a predetermined rotational play about said axis of rotation; and said first cover plate having a first pair of radially extending guide edges and said hub having a second pair of radially extending guide edges, said guide element arranged between said first cover plate and said hub and between each said first and second pairs of radially extending guide edges so that said guide element axially guides said first and second structural component groups in both axial directions.

14. The clutch disk of claim 13, wherein said hub disk is in an axially floating arrangement relative to said hub.

15. The clutch disk of claim 14, further comprising an idle spring device having an idle spring hub disk arranged without circumferential play on said outer toothing of said hub, said idle spring hub disk being held by said at least one load spring of said load friction device.

16. The clutch disk of claim 15, wherein said idle spring device comprises an idle friction device having a first idle friction part and a second idle friction part, said idle spring hub disk is axially movably arranged on said outer toothing, and said first and second idle friction parts are arranged on opposing axial sides of said idle spring hub disk.

17. The clutch disk of claim 4, wherein said first structural component group comprises a first cover plate fixedly connected to and arranged at a first distance from a second cover plate, said second structural component group comprises a hub disk extending radially outward from said hub between said first and second cover plates, and said clutch disk further comprises a load friction device comprising at least one load spring arranged between said first and second cover plates and said hub disk for generating an axial force;

said hub disk having an inner toothing in meshed engagement with an outer toothing of said hub with a predetermined rotational play about said axis of rotation; and said first and second structural component groups being operatively arranged for exerting an axial pretensioning of said guide element between said first and second structural component groups, said axial pretensioning generating a basic frictional force between said first and second structural component groups.

18. Clutch disk according to 17, wherein said load friction device further comprises a friction element between said first and second structural component groups and said outer toothing of said hub comprising first and second axial sides;

said hub disk is axially movably mounted on said outer toothing of said hub and is axially fixed between said first and second cover plates by said at least one load friction spring and said friction element, said second cover plate in frictional contact with said second axial side of the outer toothing and said axially pretensioning of said guide plate element urging said first cover element away from said first axial side of said outer toothing of said hub.

19. The clutch disk of claim 18, further comprising an idle spring device arranged between said hub disk and one of said first and second cover plates comprising an idle spring cover plate axially supported at said hub disk, on idle spring hub disk rotatably fixed and axially movably mounted on said outer toothing of said hub, and spring elements arranged between said idle spring hub disk and said idle spring cover plate; and a load friction device having at least one axially acting load friction spring arranged between said hub disk and the other of said first and second cover plates and a friction elements arranged between said idle spring cover plate and said first cover plate having a radially inner surface testing on said guide element.

20. The clutch disk of claim 19, further comprising an L-shaped bearing element mounted on said hub for supporting said guide element having a first leg concentrically mounted on said hub and extending away from said hub disk and a radially projecting second leg contacting said second axial side of said outer toothing for axially securing said idle spring hub disk.

21. A clutch disk for use in a friction clutch, comprising:

a first structural component group rotatable about an axis of rotation and having a friction element, a radially inwardly facing surface, and a radially inward facing first toothing;

a second structural component group rotatable about said axis of rotation and relative to said first structural component group and having a hub, a radially outwardly facing surface, and a radially outward facing second toothing; and a guide element including a helical spring having turns that are inclined in an axial direction operatively mounted between said radially inward facing surface of said first structural component group and said radially outward facing surface of said second structural component group for exerting a centering force on said first and second components for centering said first structural component group with respect to said second structural component group so that said first structural component group is movable relative to said second structural component group against said centering force of said guide element, said first toothing in a meshed engagement with said second toothing so that said meshed engagement fixedly connects said first structural component group and said second structural component group with respect to rotation and permits radial and angular movement of said first structural component group relative to said second structural component group.

22. The clutch disk of claim 21, wherein said guide element is radially pretensioned.

23. The clutch disk of claim 22, wherein an amount of said pretensioning corresponds to a weight of one of said first and second structural component groups.

24. The clutch disk of claim 21, wherein said guide element prevents axial movement of said first structural component group relative to said second component group in at least one axial direction.

25. The clutch disk of claim 21, wherein said guide element is arranged axially adjacent to said first and second toothing.

26. The clutch disk of claim 25, wherein said first structural component group comprises a hub disk and said clutch disk further comprises a support element axially adjacent said hub disk and an outer diameter of said hub, wherein said guide element is arranged between an inner diameter of said support element and a circumferential groove on said hub for resiliently axially supporting said hub disk with respect to said hub.

27. The clutch disk of claim 26, further comprising an axial stop arranged on said hub on a side of said hub disk opposing said support element for limiting an axial movement of said hub disk.

28. The clutch disk of claim 24, wherein said first structural component group comprises a first cover plate fixedly connected to and arranged at a first distance from a second cover plate, said second structural component group comprises a hub disk extending radially outward from said hub between said first and second cover plates, and said clutch disk further comprises a load friction device comprising at least one load spring arranged between said first and second cover plates and said hub disk for generating an axial force;

said hub disk having an inner toothing in meshed engagement with an outer toothing of said hub with a predetermined rotational play about said axis of rotation; and said first cover plate having a first pair of radially extending guide edges and said hub having a second pair of radially extending guide edges, and guide element arranged between said first cover plate and said hub and between each said first and second pairs of radially extending guide edges so that said guide element axially guides said first and second structural component groups in both axial directions.

29. The clutch disk of claim 28, wherein said hub disk is in an axially floating arrangement relative to said hub.

30. The clutch disk of claim 29, further comprising an idle spring device having an idle spring hub disk arranged without circumferential play on said outer toothing of said hub, said idle spring hub disk being held by said at least one load spring of said load friction device.

31. The clutch disk of claim 30, wherein said idle spring device comprises an idle friction device having a first idle friction part and a second idle friction part, said idle spring hub disk is axially movably arranged on said outer toothing, and said first and second idle friction parts are arranged on opposing axial sides of said idle spring hub disk.

32. The clutch disk of claim 24, wherein said first structural component group comprises a first cover plate fixedly connected to and arranged at a first distance from a second cover plate, said second structural component group comprises a hub disk extending radially outward from said hub between said first and second cover plates, and said clutch disk further comprises a load friction device comprising at least one load spring arranged between said first and second cover plates and said hub disk for generating an axial force;

said hub disk having an inner toothing in meshed engagement with an outer toothing of said hub with a predetermined rotational play about said axis of rotation; and said first and second structural component groups being operatively arranged for exerting an axial pretensioning of said guide element between said first and second structural component groups, said axial pretensioning generating a basic frictional force between said first and second structural component groups.

33. Clutch disk according to 32, wherein said load friction device further comprises a friction element between said first and second structural component groups and said outer toothing of said hub comprising first and second axial sides;

said hub disk is axially movably mounted on said outer toothing of said hub and is axially fixed between said first and second cover plates by said at least one load friction spring and said friction element, said second cover plate in frictional contact with said second axial side of the outer toothing and said axially pretensioning of said guide element urging said first cover element away from said first axial side of said outer toothing of said hub.

34. The clutch disk of claim 33, further comprising an idle spring device arranged between sand hub disk and one of said first and second cover plates comprising an idle spring cover plate axially supported at said hub disk, an idle spring hub disk rotatably fixed and axially movably mounted on said outer toothing of said hub, and spring elements arranged between said idle spring hub disk and said idle spring cover plate; and a load friction device having at least one axially acting load friction spring arranged between said hub disk and the other of said first and second cover plates and a friction element arranged between said idle spring cover plate and said first cover plate having a radially inner surface resting on said guide element.

35. The clutch disk of claim 34, further comprising an L-shaped bearing element mounted on said hub for supporting said guide element having a first leg concentrically mounted on said hub and extending away from said hub disk and a radially projecting second leg contacting said second axial side of said outer toothing for axially securing said idle spring hub disk.

36. A clutch disk for use in a friction clutch, comprising:

a first structural component group having a friction element and a radially inwardly facing surface;

a second structural component group having a hub and a radially outwardly facing surface rotatably mounted relative to said first structural component group;

an energy accumulator operatively mounted between said first structural component group and said second structural component group for exerting a circumferential force between said first and second structural component groups so that said second structural component group is rotatable relative to said first structural component group against said force of said energy accumulator;

said second structural component group comprising having a plurality of substantially round openings having inner wall surfaces;

a guide prolongation inserted through each said plural round openings and connected to said first structural component group; and a guide element including a helical spring having turns that are inclined in an axial direction operatively mounted in each said plural openings between said guide prolongation and said inner wall surface said each said plural openings for exerting a centering force on said first and second components for centering said first structural component with respect to said second structural component so that said first structural component group is movable relative to said second structural component group against said centering force of said guide element.

37. The clutch disk of claim 36, wherein said guide element is radially pretensioned.

38. The clutch disk of claim 37, wherein an amount of said pretensioning corresponds to a weight of one of said first and second structural component groups.

39. The clutch disk of claim 36, wherein said guide element prevents axial movement of said first structural component group relative to said second component group in at least one axial direction.

40. The clutch disk of claim 39, wherein said first structural component group comprises a first cover plate fixedly connected to and arranged at a first distance from a second cover plate, said second structural component group comprises a hub disk extending radially outward from said hub between said first and second cover plates, and said clutch disk further comprises a load friction device comprising at least one load spring arranged between said first and second cover plates and said hub disk for generating an axial force;

said hub disk having an inner toothing in meshed engagement with an outer toothing of said hub with a predetermined rotational play about said axis of rotation; and said first cover plate having a first pair of radially extending guide edges and said hub having a second pair of radially extending guide edges, said guide element arranged between said first cover plate and said hub and between each said first and second pairs of radially extending guide edges so that said guide element axially guides said first and second structural component groups in both axial directions.

41. The clutch disk of claim 40, wherein said hub disk is in an axially floating arrangement relative to said hub.

42. The clutch disk of claim 41, further comprising an idle spring device having an idle spring hub disk arranged without circumferential play on said outer toothing of said hub, said idle spring hub disk being held by said at least one load spring of said load friction device.

43. The clutch disk of claim 42, wherein said idle spring device comprises an idle friction device having a first idle friction part and a second idle friction part, said idle spring hub disk is axially movably arranged on said outer toothing, and said first and second idle friction parts are arranged on opposing axial sides of said idle spring hub disk.

44. The clutch disk of claim 39, wherein said first structural component group comprises a first cover plate fixedly connected to and arranged at a first distance from a second cover plate, said second structural component group comprises a hub disk extending radially outward from said hub between said first and second cover plates, and said clutch disk further comprises a load friction device comprising at least one load spring arranged between said first and second cover plates and said hub disk for generating an axial force;

said hub disk having an inner toothing in meshed engagement with an outer toothing of said hub with a predetermined rotational play about said axis of rotation; and said first and second structural component groups being operatively arranged for exerting an axial pretensioning of said guide element between said first and second structural component groups, said axial pretensioning generating a basic frictional force between said first and second structural component groups.

45. Clutch disk according to 44, wherein said load friction device further comprises a friction element between said first and second structural component groups and said outer toothing of said hub comprising first and second axial sides;

said hub disk is axially movably mounted on said outer toothing of said hub and is axially fixed between said first and second cover plates by said at least one load friction spring and said friction element, said second cover plate is frictional contact with said second axial side of the outer toothing and said axially pretensioning of said guide element urging said first cover element away from said first axial side of said outer toothing of said hub.

46. The clutch disk of claim 45, further comprising an idle spring device arranged between said hub disk and one of said first and second cover plates comprising an idle spring cover plate axially supported at said hub disk, an idle spring hub disk rotatably fixed and axially movably mounted on said outer toothing of said hub, and spring elements arranged between said idle spring hub disk and said idle spring cover plate; and a load friction device having at least one axially acting load friction spring arranged between said hub disk and the other of said first and second cover plates and a friction element arranged between said idle spring cover plate and said first cover plate having a radially inner surface resting on said guide element.

47. The clutch disk of claim 45, further comprising an L-shaped bearing element mounted on said hub for supporting said guide element having a first leg concentrically mounted on said hub and extending away from said hub disk and a radially projecting second leg contacting said second axial side of said outer toothing for axially securing said idle spring hub disk.

* * * * *